April 29, 1952     H. P. PHILLIPS     2,594,986

PISTON RING

Filed Feb. 11, 1949

INVENTOR.
Harold P. Phillips
BY
Attorney

Patented Apr. 29, 1952

2,594,986

UNITED STATES PATENT OFFICE 2,594,986

PISTON RING

Harold P. Phillips, Hastings, Mich., assignor to Hastings Manufacturing Company, Hastings, Mich.

Application February 11, 1949, Serial No. 75,839

8 Claims. (Cl. 309—45)

This invention relates to improvements in piston rings.

The main objects of this invention are:

First, to provide a piston ring assembly which is highly efficient from the standpoint of effective sealing and oil control.

Second, to provide a ring assembly which provides improved tensioning against a cylinder wall.

Third, to provide a ring assembly in which there is no gap opening, thereby providing effective sealing and prevention of "blow-by."

Fourth, to provide a ring assembly of the above type in which there is a relatively small number of parts and in which the parts may be readily and cheaply fabricated and readily assembled in a piston ring groove.

Objects relating to details and economies of my invention will appear from the description to follow. The invention is pointed out and defined in the claims.

A preferred embodiment of my invention is illustrated in the accompanying drawing in which.

Figure 1:
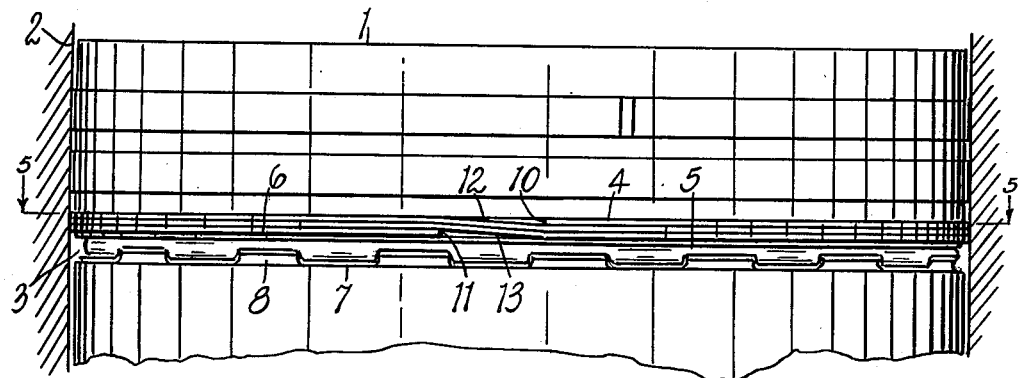
Fig. 1 is a fragmentary view of a piston, ring assembly, and cylinder in assembled relation, the piston and ring assembly being shown in side elevation and the cylinder being shown in section.

In considering the accompanying drawing, it should be borne in mind that no attempt has been made to show the parts in their relative proportion and to show the clearances and relative dimensions.

In the embodiment of the invention illustrated, 1 designates the piston and 2 the cylinder. The piston is provided with a groove 3 in which is disposed the ring assembly comprising a thin steel expansible ring side member 4 and a spacer member 5 for axially spacing the ring side member from the lower wall of the ring groove.

The spacer member 5 is of the split annular expansible type disclosed in my Patent No. 2,404,862, dated July 30, 1946. It is formed of ductile sheet metal folded upon itself into a plurality of integrally connected plies or folds disposed in side by side relation, the upper ply 6 being flat and supportingly engaging the ring side member 4 and the remaining lower plies being conformed to provide alternate spacer and drainage reaches 7 and 8 respectively. The drain reaches 8 provide passageways through the ring assembly for passage of oil therethrough to the rear of the assembly and then to the oil drain openings 9 in the piston wall. The spacer reaches 7 are supportingly engaged by the lower wall of the ring groove 3.

Figure 3:
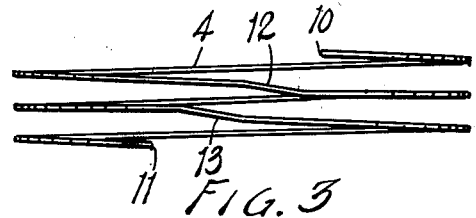
Fig. 3 is a view showing in side elevation a cylinder wall engaging ring element of the ring assembly.
Figure 2:
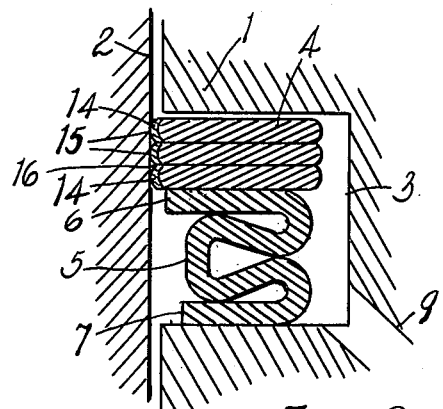
Fig. 2 is an enlarged fragmentary view showing in vertical section the piston, ring assembly, and cylinder in assembled relation.
Figure 5:
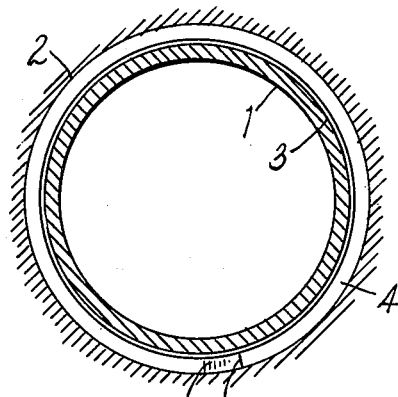
Fig. 5 is a section on line 5—5 of Fig. 1.

The ring side member 4 is formed of one continuous piece of flat steel stock coiled edgewise into slightly less than three complete coils, the ends 10 and 11 thereof being circumferentially separated as shown in Figs. 1 and 3. The portions 12 and 13 of the coils of ring side member intermediate the ends 10 and 11 thereof are prekinked as shown in Figs. 1 and 3 to facilitate the upper side of the ring member 4 lying flatly against the upper wall of the ring groove 3 and the lower side thereof lying flatly against the upper ply or wall 6 of the spacer member 5. It will be noted by reference to Figs. 1 and 2 that when the ring element 4 is in assembled position that the kinked portion thereof is disposed in its entirety between the spaced ends 10 and 11 and that the three convolutions thereof are disposed in abutting relation throughout the length thereof.

Figure 4:
Fig. 4 is a view showing in side elevation a modification of the ring element shown in Fig. 3.

The ring side member 4 is formed of flat stock of high unit contact steel and is relatively thin, being between approximately .010 and .020 of an inch in thickness, and preferably approximately .013 of an inch in thickness. Use of this very thin steel facilitates, if desired, the production of the ring side members without preformed kinks between the ends 10 and 11 thereof before installation of the ring side member 4 into the ring groove 3, as shown in Fig. 4. The ring side member, by reason of its thinness, assumes the kink formation between the ends 10 and 11 thereof as shown at 12 and 13 in Fig. 1 after installation into the ring groove. Also, such degree of thinness facilitates the production of nearly three complete turns in the side ring member without increasing the axial dimension of the ring groove and without reducing the axial dimension of the spacer member 5. The use of three coils or convolutions in the ring side member eliminates, by reason of the increased tensioning thereof against the cylinder wall, the necessity of an inner or expander spring and avoids groove depth problems.

The cylinder wall engaging faces of the coils of the ring side member are chrome plated, the plating 14 having the cylinder wall engaging surfaces thereof curved in the arc of a circle, and the radius of the arc of the curvature being not greater than .045 of an inch to provide a hair-line contact 15 with the cylinder wall. The outwardly curved surfaces of adjacent convolutions provide an annular oil receiving pocket 16 therebetween to facilitate lubrication at the hair-line contact of the convolutions with the cylinder wall.

I have illustrated and described very practical embodiments of my invention. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A piston ring assembly comprising a resilient expansible side ring member and a split expansible spacer member supportingly engaging said side ring member, said spacer member having a lower wall to be supportingly engaged by the lower wall of a piston ring groove, said spacer member having alternate spacer and drainage reaches, said side ring member having an upper wall to be retainingly engaged by the upper wall of a piston ring groove and having an outer peripheral edge to tensioningly engage a cylinder wall, said side ring member comprising a strip of ribbon steel of approximately .013 of an inch in thickness coiled edgewise into three substantially complete convolutions with the ends thereof circumferentially spaced and with a kinked portion intermediate said ends when the side ring member is in assembled position in a piston ring groove, the strip being coiled edgewise with the plane of the convolutions disposed at substantially right angles to the axis of the ring member, said three convolutions of said side ring member constituting the sole means for tensioning the cylinder wall engaging edge of the side ring member against the cylinder wall, said ring element when in assembled position in the ring groove being integrally continuous from end to end thereof, and having its three convolutions in abutting relation throughout their lengths and having the kinked portion thereof in its substantial entirety disposed between said spaced ends.

2. A piston ring assembly comprising a resilient expansible side ring member and a split expansible spacer member supportingly engaging said side ring member, said spacer member having a lower wall to be supportingly engaged by the lower wall of a piston ring groove, said side ring member having an upper wall to be retainingly engaged by the upper wall of a piston ring groove and having an outer peripheral edge to tensioningly engage a cylinder wall, said side ring member comprising a strip of ribbon steel coiled edgewise into three substantially complete convolutions with the ends thereof circumferentially spaced and with a kinked portion intermediate said ends when the side ring member is in assembled position in a piston ring groove, the strip being coiled edgewise with the plane of the convolutions disposed at substantially right angles to the axis of the ring member, said three convolutions of said side ring member constituting the sole means for tensioning the cylinder wall engaging edge of the side ring member against the cylinder wall, said ring element when in assembled position in the ring groove being integrally continuous from end to end thereof, and having its three convolutions in abutting relation throughout their lengths and having the kinked portion thereof in its substantial entirety disposed between said spaced ends.

3. A piston ring assembly comprising a resilient expansible side ring member and a split expansible spacer member, said members being in axially superimposed relation to each other, said side ring member having an outer peripheral edge to tensioningly engage a cylinder wall, said side ring member comprising a strip of ribbon steel coiled edgewise into three substantially complete convolutions with the ends thereof circumferentially spaced and with a kinked portion intermediate said ends, the strip being coiled edgewise with the plane of the convolutions disposed at substantially right angles to the axis of the ring member, said three convolutions of said side ring member constituting the sole means for tensioning the cylinder wall engaging edge of the side ring member against a cylinder wall, said ring element when in assembled position in the ring groove being integrally continuous from end to end thereof, and having its three convolutions in abutting relation throughout their lengths and having the kinked portion thereof in its substantial entirety disposed between said spaced ends.

4. A piston ring assembly comprising a resilient expansible side ring member and a split expansible spacer member, said members being in axially superimposed relation to each other, said side ring member having an outer peripheral edge to tensioningly engage a cylinder wall, said side ring member comprising a strip of ribbon steel coiled edgewise into three substantially complete convolutions with the ends thereof circumferentially spaced and with a kinked portion intermediate said ends, said strip being coiled edgewise with the plane of the convolutions thereof disposed substantially at right angles to the axis of the ring member, said ring element when in assembled position in the ring groove being integrally continuous from end to end thereof, and having its three convolutions in abutting relation throughout their lengths and having the kinked portion thereof in its substantial entirety disposed between said spaced ends.

5. In a piston ring assembly, a resilient expansible ring member having an outer peripheral edge to tensioningly engage a cylinder wall and comprising a strip of ribbon steel coiled edgewise into three substantially complete convolutions with the ends of the strip circumferentially spaced to permit kinking the portion of the ring intermediate said ends, said strip being coiled edgewise with the plane of the convolutions thereof disposed substantially at right angles to the axis of the ring member, said three convolutions constituting the sole means for tensioning the cylinder wall engaging edge of the ring member against a cylinder wall, said ring element when in assembled position in the ring groove being integrally continuous from end to end thereof, and having its three convolutions in abutting relation throughout their lengths and having the kinked portion thereof in its substantial entirety disposed between said spaced ends.

6. In a piston ring assembly, a resilient expansible ring member having an outer peripheral edge to tensioningly engage a cylinder wall and comprising a strip of ribbon steel of approximately .013 of an inch in thickness coiled edgewise into three substantially complete convolutions with the ends of the strip circumferentially spaced to permit kinking the portion of the ring intermediate said ends, said strip being coiled edgewise with the plane of the convolutions thereof disposed substantially at right angles to the axis of the ring member, said ring element when in assembled position in the ring groove being integrally continuous from end to end thereof, and having its three convolutions in abutting relation throughout their lengths and having the kinked portion thereof in its substantial entirety disposed between said spaced ends.

7. In a piston ring assembly, a resilient expansible ring member having an outer peripheral edge to tensioningly engage a cylinder wall, and comprising a strip of metal coiled edgewise into not less than three substantially complete convolutions with the ends of the strip circumferentially spaced, the portion of the convolutions intermediate said spaced ends being kinked in the assembled position of the ring member in a piston ring groove, the convolutions all being in superimposed abutting relation in the assembled position of the ring member in a piston ring groove, the strip being coiled edgewise with the plane of the convolutions disposed at substantially right angles to the axis of the ring member, said convolutions constituting the sole means for tensioning the cylinder wall engaging edge of the ring member against a cylinder wall, said ring element when in assembled position in the ring groove being integrally continuous from end to end thereof, and having its three convolutions in abutting relation throughout their lengths and having the kinked portion thereof in its substantial entirety disposed between said spaced ends.

8. In a piston ring assembly, a resilient expansible ring member having an outer peripheral edge to tensioningly engage a cylinder wall, and comprising a strip of metal coiled edgewise into not less than three substantially complete convolutions with the ends of the strip circumferentially spaced, the portion of the convolutions intermediate said spaced ends being kinked in the assembled position of the ring member in a piston ring groove, the strip being coiled edgewise with the plane of the convolutions disposed at substantially right angles to the axis of the ring member, the convolutions all being in superimposed abutting relation in the assembled position of the ring member in a piston ring groove, said ring element when in assembled position in the ring groove being integrally continuous from end to end thereof, and having its three convolutions in abutting relation throughout their lengths and having the kinked portion thereof in its substantial entirety disposed between said spaced ends.

HAROLD P. PHILLIPS.

REFERENCES CITED

The following references are of record in the file of this patent:

UNITED STATES PATENTS

| Number | Name | Date |
|---|---|---|
| 2,068,114 | Solenberger | Jan. 19, 1937 |
| 2,073,500 | Sopp | Mar. 9, 1937 |
| 2,091,947 | Cords | Aug. 31, 1937 |
| 2,125,541 | Carlton | Aug. 2, 1938 |
| 2,235,297 | Norton et al. | Mar. 18, 1941 |
| 2,260,612 | Fall | Oct. 28, 1941 |
| 2,277,926 | Mayfield | Mar. 31, 1942 |
| 2,281,873 | Engelhardt | May 5, 1942 |
| 2,288,911 | Marien | July 7, 1942 |
| 2,404,862 | Phillips | July 30, 1946 |

FOREIGN PATENTS

| Number | Country | Date |
|---|---|---|
| 504,608 | Great Britain | of 1938 |